Patented Nov. 3, 1925.

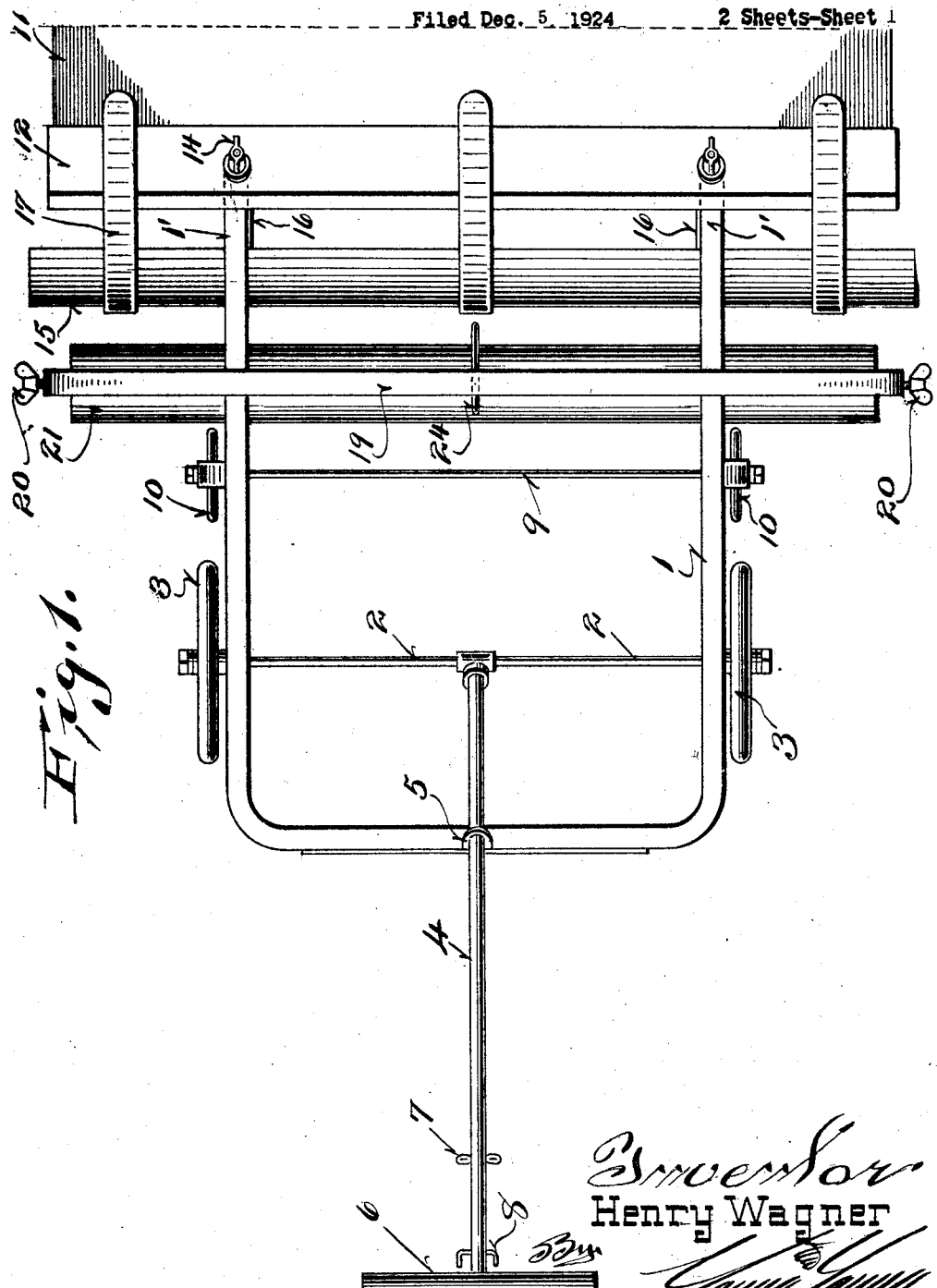

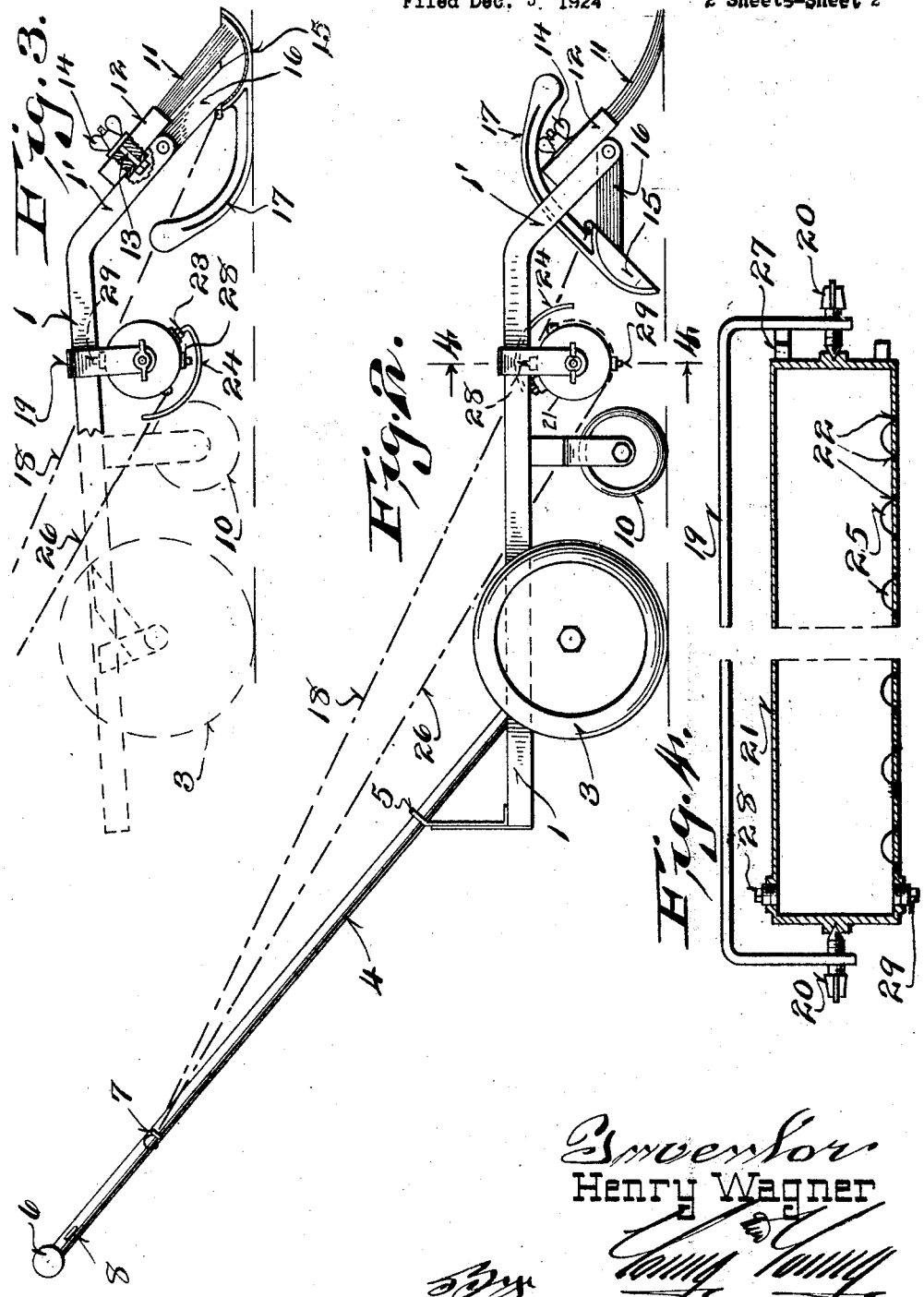

1,560,445

UNITED STATES PATENT OFFICE.

HENRY WAGNER, OF MILWAUKEE, WISCONSIN.

SHELLACKING MACHINE.

Application filed December 5, 1924. Serial No. 754,105.

*To all whom it may concern:*

Be it known that I, HENRY WAGNER, a citizen of the United States, and resident of Milwaukee, in the county of Milwaukee and State of Wisconsin, have invented certain new and useful Improvements in Shellacking Machines; and I do hereby declare that the following is a full, clear, and exact description thereof.

This invention relates to a machine for coating a surface, and is particularly directed to a shellacking machine.

Objects of this invention are to provide a shellacking machine which will shellac a large surface with one travel of the machine thereover, which will apply the shellac throughout a large area in a uniform and effective manner, which is extremely rapid in its operation, and which may be easily controlled.

In bowling alleys, it is highly desirable that the surface be shellacked at frequent intervals to maintain it in good condition, and it has heretofore been found a tedious and relatively expensive operation, and that this work requires considerable time.

However, in practising this invention, a machine is provided which is eminently suited to shellacking bowling alleys, which will shellac the entire alley with one travel of the machine thereof, and which can be easily operated by an unskilled laborer, thus materially simplifying and cheapening this operation.

An embodiment of the invention is shown in the accompanying drawings, in which:—

Figure 1 is a plan view of the device.

Figure 2 is a side elevation of the structure shown in Figure 1, showing the protecting trough or cup in inoperative position.

Figure 3 is a view showing the protecting trough in operative position.

Figure 4 is an enlarged sectional view on the line 4—4 of Figure 2.

The machine comprises a carriage which is preferably formed of a U-shaped member 1 formed of channel iron or similar structural steel. This frame 1 is provided with a transversely extending main axle 2 upon which the main wheels 3 are mounted. A manipulating handle 4 passes through an eyeleted bracket 5 secured to the rear portion of the frame and is attached at its forward end to the transverse axle, as shown in Figure 1. This handle is provided with a cross bar 6 and with hooks 7 and 8 for a purpose hereinafter to appear. The frame is further provided with an auxiliary transverse axle 9 which carries the auxiliary wheels 10, as clearly shown in Figures 1 and 2.

The forward end of the frame 1 is downturned, as indicated at 1', and removably receives a brush 11. This brush is provided with a base portion 12, such base portion having a plurality of apertures therethrough adapted to receive bolts 13 which pass through the frame members 1', as shown clearly in Figure 3. These bolts are provided with winged thumb nuts 14 to permit the ready removal of the brush.

It is to be noted particularly from Figures 1 and 2, that a protecting cup 15 is provided for the brush 11. This cup is slightly longer than the elongated brush 11, as clearly shown in Figure 1. It is carried by means of a pair of links 16 rigid therewith which are pivoted at their outer ends to the forward ends of the downturned portions 1' of the frame, thus permitting the protecting cup or trough 15 to be rocked into either the operative position shown in Figure 3, or the inoperative position shown in Figure 2.

It is to be noted that the trough is provided with a plurality of curved weighted arms 17 whose outer weighted ends rock from one side of dead center to the other side thereof, as shown in Figures 2 and 3, and thus aid in maintaining the trough in either of its two positions, and also aid in manipulating the trough, as will appear hereinafter.

In order to permit the ready manipulation of the trough from a point adjacent the handle 4, a cable or chain 18 is provided, as shown in Figure 2, and is attached at one end to the trough and at the other end is hooked over the hooks 7. When the trough is in the position shown in Figure 3, it is merely necessary to slightly tilt the frame about the main wheels 3 and to draw upon the cable until the trough occupies the position shown in Figure 2. Thereafter, the end of the cable which may be provided with an eyelet, if desired, is hooked over one of the hooks 7 or 8. When it is desired to replace the trough so that it receives the end of the brush, it is merely necessary to rock the forward end of the carriage upwardly by pressing down upon the handle bars 6. This causes the trough to swing about the pivot point and beneath the brush 11. The weighted arms 17, thereafter, hold the trough in position.

At a point intermediate the ends of the frame 1, a transverse strap-like member 19 is provided and is equipped with downturned ends, as shown in Figures 2, 3 and 4. These downturned ends are provided with pointed trunnion screws or bearing screws 20 which fit within corresponding socketed or recessed bosses of a drum 21. This drum, as may be seen from Figure 4, is provided with a plurality of apertures 22 arranged in a regular order, and in a line extending longitudinally of the drum. The drum is adapted to carry shellac and to discharge such shellac in an even manner through the apertures 22.

An air vent is provided which opens into the upper side of the drum. This air vent comprises a plug 23 which is equipped with a curved or arcuate pipe 24, (see Figures 1 and 3.) The drum is provided with a plurality of weights 25 adjacent the apertures 22 which tend to rock the drum into the position shown in Figure 4. A cable or chain 26 is partly wrapped around the drum and is adapted to be hooked over the hooks 7 or 8, such chain or cable being provided with a ring at its outer end if desired. Thus when it is desired to rock the drum into the position shown in Figure 3, that is to say, with the apertures 22 on the upper side, it is merely necessary to draw up on the chain or cable 26 and thus rock the drum against the action of the weights 25 into the inoperative position shown in Figure 3. When in this position shellac will not be discharged through the air vent 24 for the reason that the air vent is curved upwardly and extends above the line of the shellac. If desired, stops 27 may be carried by the drum and by the member 19 to limit the motion of the drum and prevent its rocking to more than approximately a half a turn.

In using the device the flexible member 18 is drawn upon and rocks the protecting trough 15 into the position shown in Figure 2. The machine is then positioned at approximately the point from which the start is to be made. Thereafter, the flexible member 26 is manipulated and its end secured to a hook thus rotating the shellac carrying drum into operative position, as shown in Figures 2 and 4. The operator then draws the machine after him so that the brush 11 sweeps over the shellac approximately uniformly distributed from the drum, and thus insures a perfectly uniform even coating of the shellac over the entire area of the bowling alley.

In using the machine, it is merely necessary to draw the carriage over the bowling alley a single time and this operation may be very quickly performed. It will be seen, therefore, that a shellac or surface coating machine is provided which is extremely rapid in its operation, which may be operated by an unskilled laborer, and which is simple and relatively sturdy in its construction. Further, it will be noted that the drum may be most readily removed for cleaning by loosening the screws 20 and that the brush 12 may be as easily removed by removing the thumb nuts 14. However, it is preferable, prior to the removal of the drum, to remove the drain plug 28 (see Figures 3 and 4) to thus permit the discharge of the shellac from the drum. Further, the drum may be readily filled by removing the filling plug 29, such filling plug being positioned on the upper side of the drum when such drum is in inoperative position, as shown in Figure 3.

Although the invention has been described in considerable detail, it is to be understood that the invention may be variously embodied and is, therefore, to be limited only as claimed.

I claim:

1. A surface coating machine comprising a portable carriage, a rotary drum adapted to carry the coating and mounted transversely thereof and having a delivery portion, means for rotating said drum to position said delivery portion either uppermost or lowermost, and an elongated brush extending transversely of said carriage.

2. A surface coating machine comprising a portable carriage, a rotary drum adapted to carry the coating and mounted transversely thereof and having a delivery portion, means for rotating said drum to position said delivery portion either uppermost or lowermost, an elongated brush extending transversely of said carriage, and a projecting trough adapted to be rocked beneath said brush.

3. A surface coating machine comprising a portable carriage, a handle for propelling said carriage, a rotary coating carrying drum mounted transversely of said carriage, and having a longitudinally extending row of delivery apertures, an elongated brush extending transversely of said carriage, a protecting trough adapted to be rocked beneath said brush, and means operable from adjacent said handle for selectively controlling said drum and said trough.

4. A surface coating machine comprising a portable carriage, a handle for propelling said carriage, a rotary coating carrying drum mounted transversely of said carriage and having a longitudinally extending row of delivery apertures, an elongated brush extending transversely of said carriage, a protecting trough adapted to be rocked beneath said brush, means operable from adjacent said handle for selectively controlling said drum and said trough, and a weight tending to hold said trough either beneath said brush or removed therefrom.

5. A shellacking machine comprising a carriage having a pair of main wheels about which said carriage may be tilted and having a pair of auxiliary wheels, a manipulating handle extending from said carriage, a shellac carrying drum revolubly mounted upon said carriage and having a longitudinally extending row of delivery apertures, said drum having means tending to hold said apertures uppermost, an elongated brush extending transversely of said carriage, a trough adapted to be rocked beneath said brush, means for rotating said drum to present said apertures downwardly, and means for rocking said trough.

6. A surface coating machine comprising a wheeled carriage, a coating carrying drum extending transversely of said carriage, and having a longitudinally extending row of apertures, a non-discharging air vent located on opposite sides thereof, means for rotating said drum, and a transversely extending brush.

In testimony that I claim the foregoing I have hereunto set my hand at Milwaukee, in the county of Milwaukee and State of Wisconsin.

HENRY WAGNER.